(12) United States Patent
Kaufmann

(10) Patent No.: US 6,479,006 B1
(45) Date of Patent: Nov. 12, 2002

(54) METHOD FOR FRAMING A DECORATIVE MATERIAL

(76) Inventor: Georg Kaufmann, Steinäckerstrasse 2c, CH-5442 Fislisbach (CH)

( * ) Notice: Subject to any disclaimer, the term of this patent is extended or adjusted under 35 U.S.C. 154(b) by 0 days.

(21) Appl. No.: 09/297,140
(22) PCT Filed: Sep. 12, 1997
(86) PCT No.: PCT/CH97/00337
§ 371 (c)(1), (2), (4) Date: Jul. 2, 1999
(87) PCT Pub. No.: WO98/17461
PCT Pub. Date: Apr. 30, 1998

(30) Foreign Application Priority Data

Oct. 24, 1996 (CH) .............................................. 2604/96

(51) Int. Cl.⁷ .......................... B29C 45/14; B29C 70/76
(52) U.S. Cl. ..................... 264/275; 264/252; 264/271.1
(58) Field of Search ................................ 264/259, 268, 264/271.1, 275, 252, 254, 250, 274, 279, 279.1

(56) References Cited

U.S. PATENT DOCUMENTS

| | | | | |
|---|---|---|---|---|
| 3,931,385 A | * | 1/1976 | Sutch .......................... | 264/154 |
| 4,225,548 A | * | 9/1980 | Wassmann ................... | 264/130 |
| 4,238,047 A | * | 12/1980 | Helms et al. ................ | 220/306 |
| 4,491,556 A | | 1/1985 | Fujii et al. | |
| 4,497,765 A | * | 2/1985 | Wilde et al. ................ | 264/268 |
| 5,262,114 A | * | 11/1993 | Boyce et al. ................ | 264/257 |
| 5,273,416 A | * | 12/1993 | Heyn et al. ............... | 425/126.1 |
| 5,830,398 A | * | 11/1998 | Heyn et al. ................ | 264/154 |
| 5,897,823 A | * | 4/1999 | Davis et al. ................ | 264/266 |
| 6,033,613 A | * | 3/2000 | Heyn et al. ................ | 264/259 |
| 6,120,720 A | * | 9/2000 | Meier et al. ................ | 264/261 |
| 6,165,404 A | * | 12/2000 | Savonuzzi ................... | 264/266 |
| 6,258,312 B1 | * | 7/2001 | Heyn .......................... | 264/252 |

FOREIGN PATENT DOCUMENTS

| | | |
|---|---|---|
| CA | 960827 | 1/1975 |
| DE | 3712882 A1 | 11/1987 |
| FR | 2550848 | 2/1985 |
| GB | 1271860 | 4/1972 |
| GB | 1575962 | 10/1980 |

* cited by examiner

*Primary Examiner*—Angela Ortiz
(74) *Attorney, Agent, or Firm*—Venable; Catherine M. Voorhees

(57) ABSTRACT

Method and device for the bordering of decorative material (1), in particular a carpet, a fabric or a sheet, a border (4) being capable of being formed in a die mould (2) for back-pressing and/or back-injection, at least parts of the edge (3) of this decorative material (1), characterized in that this border (4) comprises a rim (7) which extends essentially at right angles to the main direction of extent (8) and along the edge (3) of this decorative material (1) and which is essentially at right angles to the main direction of extent (8) of the decorative material (1) and comprises a multiplicity of fingers (9) engaging over and/or under the decorative material (1), this rim (7) and these fingers (9) being capable of being produced in one piece and of being connected to the decorative material (1) in the same operation.

12 Claims, 6 Drawing Sheets

METHOD FOR FRAMING A DECORATIVE MATERIAL

BACKGROUND OF THE INVENTION

The invention relates, according to a first aspect, to a method for the bordering of decorative material, in particular a carpet, a fabric or a sheet, in which a one-piece border is formed in a die mould for back-pressing and/or back-injection, at least on parts of an edge of this decorative material, the said border comprising a rim which extends essentially at right angles to the main direction of extent and along the edge of this decorative material and which comprises a multiplicity of fingers which engage over the decorative material, the production of the rim and of the fingers and their connection to the decorative material taking place in one operation.

According to a second aspect, the invention relates to a die for producing a rim and fingers of a one-piece plastic border of decorative materials, the said border being capable of being produced by means of an back-pressing method or a combined back-pressing/back-injection method and, in particular, being capable of being integrally formed onto a decorative layer or of being connected to the latter.

Decorative materials, such as overlay or lining carpets for motor vehicles, are conventionally beaded. This beading is generally not detrimental to the desired flexibility of the carpet edge (adaptation to prevailing unevenesses). However, such beadings are costly to produce and, moreover, have a considerable tendency to become soiled. The lifetime of such an overlay carpet is usually limited precisely because a beading has been damaged. In view of this problem, overlay carpets for motor vehicles are produced, for example, by first producing a hard-wearing carrier material from plastic by means of the injection-moulding technique. A decorative material, that is to say a carpet cut to size, has to be glued into this carrier material in a further operation. So that cutting tolerances in the carpet can be absorbed or coloured, but also to make a reinforced border available for the carpet edge, the carrier material is preferably produced with an undercut. This undercut, on the one hand, solves the problem of the cutting tolerances, but, on the other hand, there is a new problem: complicated, that is to say costly, injection moulds with corresponding slide systems are necessary in order to produce a clean undercut with an overhang which is suitable for covering tolerances of a plurality of millimetres. Only with the aid of such slide systems is it at all possible to remove the ready-moulded carrier material for the mould without any damage. Moreover, carpet edges bordered in this way prove to be insufficiently flexible. Furthermore, in practice, the operation of gluing the decorative material onto the carrier material represents an additional increase in price of the final product.

In many fields of technology, structural parts made of plastic are used, which have to satisfy not only functional requirements, but also aesthetic demands. One example of this, among many, is motor vehicle manufacture, where such plastic structural parts are used for interior trims, rear-window shelves, boot covers, dashboards and the like. To give these an aesthetically attractive design, therefore, a decorative layer is often attached as a separate surface layer to a visible side of the plastic structural part. For reasons of easy disposal or simplified reuse, the decorative material should preferably be produced from the same material as the plastic structural part carrying it. Such monomaterials can thus be recycled substantially more cost-effectively than composite materials which first have to be separated. The so-called back-pressing method was developed in order to produce plastic structural parts of this kind. This method is described in the publication "Kunststoffe im Automobilbau, VDI-Verlag GmbH, Dusseldorf 1994" ["Plastics in Motor Vehicle Manufacture, VDI-Verlag GmbH, Dusseldorf 1994"]. It provides for fastening a decorative layer to a die upper part of an opened die mould in such a way that it covers the surface of the die upper part, if appropriate over the entire area. Subsequently, a melted and therefore flowable plastic mass is injected or inserted into the die mould which continues to remain open. Thereafter, the mould is closed, with the result that the plastic mass is distributed uniformly in the mould under the closing pressure and, at least in the case of decorative materials with pores, such as, for example, textile materials, penetrates partially into the decorative material. The plastic mass subsequently solidifies and makes an intimate bond with the decorative layer. This back-pressing method may also be combined with the back-injection method.

Such an back-pressing and/or back-injection method may be used in order to produce a carrier layer which is suitable for a decorative material. As a result of the one-piece production of this carrier layer, which could be integrally formed onto an edge, the cutting tolerances in the carpet would be compensated and production simplified by the avoidance of the operation of gluing on the carpet. A serious problem here, however, is the positioning of the edge of the decorative material in the cavity of a die mould for back-pressing or back-injection. As a result of the positive-displacement pressing of the plastic material melt introduced, the edge of the decorative material may, for example, be upset or raised in an unforseeable way. It is therefore not possible to ensure a clean formation of a border which reliably covers the edge of the decorative material. Moreover, the edge can scarcely achieve the desired flexibility in this way.

Devices and methods known from the prior art disclose means for reinforcing the decorative material/carrier layer connection, but they do not propose any means for designing a more flexible border of the edge of a decorative material:

U.S. Pat. No. 4,491,556 discloses a method and a device for producing a carpet mat, with an injection-moulding unit which comprises two moulds. A multiplicity of pits is arranged in a first mould which has a depression for receiving a carpet running parallel to the parting plane. These pits correspond to intervals arranged in that part of a second mould which corresponds to the depression of the carpet receptacle. At the same time, at least one of the moulds has a cavity for forming the edges of a mat underlay, and the method involves fitting a carpet into this receiving depression and injecting a thermoplastic resin into the space between the carpet and the pits, in order to provide a mat underlay which is simultaneously connected to the carpet. This publication relates mainly to underlaying the carpet material with a plastic bed (cf. FIGS. 6 and 7).

DE 37 12 882 relates to a lining moulding, in particular a floor covering of a motor vehicle, the said moulding having a bordered carpet layer and additional layer. The border is formed by a solid-profile plastic body. This is integrally formed directly onto the edges of the carpet layer and additional layer. In the region of the edge of the carpet layer, the pile of the latter is embedded into the plastic body.

CA 960 827 relates to a method for producing a utensil (in particular, a perforated lid for covering a frying pan when meat is being fried) which comprises a metal grid and a cast plastic ring. Here, the plastic ring consists of a thermoplastic material and surrounds the edge of the grid. The method involves the following steps: production of a metal grid having at least one marking hole; provision of a two-part casting mould comprising a cavity, by means of which an outer ring can be cast, which is formed in such a way that the metal grid is bordered and supported; provision of at least one pin in one moulding, the said pin in each case fitting a marking hole of the grid; provision of a depression in the other moulding, the pin fitting into the said depression when the two mouldings are joined together; orientation of the metal grid with all the marking holes and pins arranged therein; closing of the mould and execution of the injection-moulding operation. For the purpose of improving the stability, the metal grid/ring connection is to be reinforced.

GB 1 271 860 relates to the production of filter elements consisting of a filtering membrane, the outer edge of which is embedded in a sealing element. For the better retention of the membrane during injection-moulding, the two mould halves have lugs which are always located opposite lugs arranged on the other mould half, so that a membrane laid between the mould halves is held securely by means of the pairs of lugs, even when injection is carried out at high pressure. A holding ring is cast on the lugs on the inside. This holding ring is connected via some webs to the outer ring which acts as a sealing element.

SUMMARY OF THE INVENTION

The object of the invention is to supply borders of decorative materials, in particular carpets, textiles or sheets, with a border which is integrally formed by the back-pressing and/or back-injection of a flowable mass and which cleanly borders and reinforces at least parts of the edge of these decorative materials and affords improved flexibility, as compared with the prior art, and which during the production of which the use of slides for producing an undercut may be dispensed with.

According to a first aspect of the invention, this object is achieved in that a method of the type described in the introduction, for the bordering of decorative material, in particular a carpet, a fabric or a sheet, is proposed, in which a border is formed in a die mould for back-pressing and/or back-injection, at least on parts of an edge of this decorative material, and which is characterized by the following steps:

insertion of decorative material into a cavity of the die mould, the said cavity being formed by die halves;

introduction of a flowable mass into the cavity of the die mould;

closing of the die mould;

distribution of the flowable mass in the cavity;

one-piece formation of a rim, which extends essentially at right angles to the main direction of extent of the decorative material and along the edge of this decorative material, and of a multiplicity of fingers which engage over the decorative material;

connection of the rim and of the fingers to the decorative material;

ejection of the bordered decorative material after the at least partial solidification of the mass.

A plastic melt is preferred as a flowable or pasty mass when this method is carried out.

Moreover, with a device of the type described in the introduction being proposed, the object is achieved, according to the invention, in that this device for the bordering of decorative material, in particular a carpet, a fabric or a sheet, comprises a die mould for back-pressing and/or back-injection, by means of which a border can be formed at least on parts of the edge of this decorative material, the device being characterized in that this die mould has recesses which are designed for the moulding of fingers and, consequently, for the flow-round of a mass and bordering the edge of the decorative material, and in that this die mould has holding webs, by which the recesses can be separated from one another by means of which the decorative material can be positioned, in order to prevent deformations of the edge, these holding webs reaching as far as the recess for a rim which extends essentially at right angles to the main direction of extent and along the edge of this decorative material and which can be produced in one piece with a multiplicity of fingers engaging over and/or under the decorative material and can be connected to the decorative material in the same operation.

Special embodiments of the method according to the invention and of the device according to the invention are found in the subclaims, which also list production means or mould parts, such as depressions, webs and the like, for the integral forming of webs, supporting lattices, supporting plates, bosses, strips, orifices and the like, and for the bordering of the same or different decorative materials or for producing an insert on one side or on both sides of a rim which, if appropriate, is narrowed on one side or on two sides.

The method described above is basically suitable for all plastics and other flowable or pasty masses which can solidify and which can be processed by means of the back-pressing method or by back-injection. Those materials may be used as a surface layer or decorative layer which make a firm connection with such a mass or with such a plastic during the back-pressing operation. Textile materials, such as carpets and knitted fabrics, as well as plastic sheets, may be mentioned, merely by way of example, in this respect. However, those combinations of masses or plastics and materials of the decorative layer which are of purely the same sort are preferred, so that the bordered decorative material, after its intended use, can be comminuted at little outlay and reused as monomaterial.

The fingers integrally formed according to the invention onto the rim are obtained by means of corresponding recesses in one or both die-mould halves. Holding webs of the die mould extend between these recesses as far as the rim, that is to say up to and beyond the edge of the inserted decorative materials, and rest directly against the decorative material. This ensures, during the positive-displacement pressing or during the back-injection of the flowable mass or plastic material melt, that the latter can flow round the decorative material, so as to form the rim and the fingers, but that the decorative material is held reliably at its edge and is positioned in the cavity of the die mould. Deformations, such as, for example, upsetting or raising the decorative material above the level of the main direction of extent, are thereby avoided. The use of slides may be dispensed with as a result of the inventive design of the die mould.

The dimensions of the fingers are preferably determined in such a way that the latter are substantially longer than they are wide. The distances between the fingers are, at the same time, selected in such a way that, depending on the stability or deformability of the decorative material, this decorative material cannot reach the upper level of the fingers or the rim, by being bent up or deformed, either during back-injection and/or back-pressing or in the finished product. Such a rim integrally form in one piece onto the decorative material has a highly subdivided longitudinal structure, with the result that good flexibility of the border is achieved.

In preferred variants of the method, fingers can be provided on the top side and the underside of the rim. Moreover, if the decorative material has sufficient stability (if, for example, it is a hard-wearing carpet), the height of the rim may be reduced to the thickness of the carpet; the integrally formed fingers then engage over and under the carpet. Optionally, in this case, the upper fingers are designed in such a way that the carpet pile, which straightens up again after back-pressing and/or back-injection, does not reach, or only just reaches, or does not project above, the upper level of the fingers or of the rim. Furthermore, these fingers may merge into ribs integrally formed on the rim or the ribs integrally formed on the outside of the rim may be continued in the fingers. The advantage of this is that the rim may be designed to be even thinner and, nevertheless, the edge of the decorative material is reliably reinforced and bordered.

In preferred embodiments of the invention, there may be provision for the two mould halves to be capable of being closed and opened in a straight movement. This makes it possible to reduce the production time for the border of a decorative material appreciably.

BRIEF DESCRIPTION OF THE DRAWINGS

The invention is explained in more detail below with reference to exemplary embodiments illustrated diagrammatically in the figures of which.

DETAILED DESCRIPTION OF THE INVENTION

Figure 1:
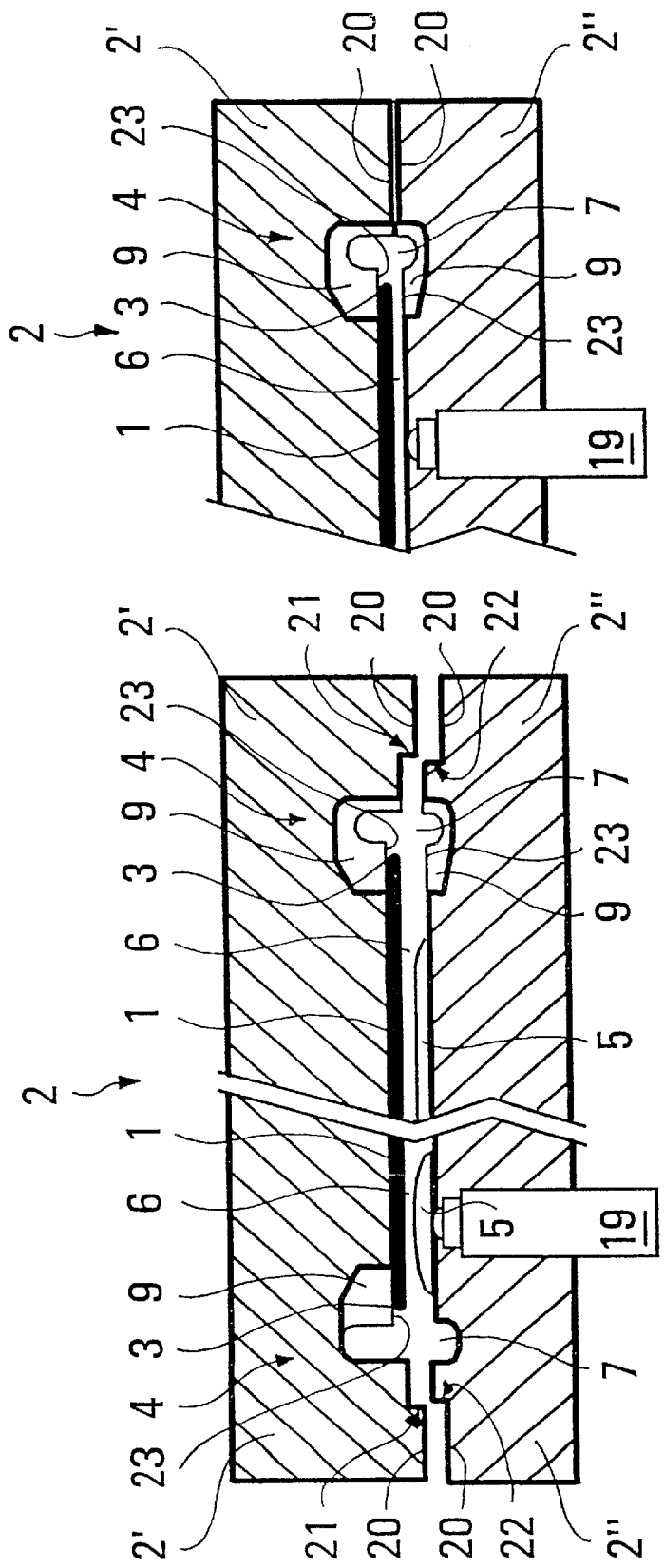
FIGS. 1a, 1b, and 1c show sectional illustrations of die moulds for producing the border of the edge of a decorative material.

The first embodiment, illustrated in FIG. 1a), of a die mould 2 for combined back-pressing/back-injection is an integral part of a machine, not otherwise shown in any more detail, which is designed to produce borders 4 of a decorative material 1 by means of the source-flow method. The die, which is opened to some extent and is designed as a vertical closing unit, has a die upper part 2' which is located opposite a die lower part 2" in such a way that their parting plane runs essentially horizontally. Moreover, the die 2 comprises at least one heating duct, a heating/cooling device, a sprue bush, an ejection tool and a control, none of which are illustrated.

The die upper part 2' is designed, on its underside, in such a way that it has the negative contour of a border 4 of a decorative material 1 or the edges 3 of the latter, the said border having to be produced by means of the said die. Recesses for a rim 7 and fingers 9 can be seen, the recesses for the fingers 9 being separated from one another by holding webs 23. The holding webs 23 extend as far as the rim 7 which is to be formed. The contour formed on -the die upper part 2' runs essentially horizontally. At the edge regions, the die upper part 2' has horizontal bearing regions 20 and a peripheral dipping cant 21. In FIG. 1a, in the horizontal regions, the die upper part 2' is provided with a holding means which is not illustrated. This preferably consists of a plurality of vacuum nozzles which are distributed uniformly and hold the inserted decorative material 1 in position.

Formed on the top side of the die lower part 2" is the lower part of the die mould 2 which runs essentially horizontally. At the edge regions, it likewise has horizontal bearing regions 20 and a cant 22 located opposite the peripheral dipping cant 21. When it bears on the die lower part 2", the die upper part 2' forms with the latter a cavity 6 having a contour which corresponds to the border 4 to be produced for a decorative material 1. Feed lines designed as vertically oriented needle-closure nozzles 19 open into this cavity 6. The plasticized plastic mass 5, maintained at a predetermined temperature, passes through the heating duct, not illustrated, having a controllable temperature into the needle-closure nozzles 19 and the cavity 6.

The second embodiment, illustrated in FIG. 1b), of a die mould 2 for back-pressing is an integral part of a machine, likewise not otherwise shown in any more detail, designed for the production of borders 4 of a decorative material 1 by means of the extrusion-laying method. In contrast to FIG. 1a), here the die mould 2 is designed in such a way that it is possible, by means of the latter, to produce borders 4 which comprise a thinner rim 7 and both lower and upper fingers 9 which in each case are separated from one another by holding webs 23.

In a third embodiment, illustrated in FIG. 1c) of the method according to the invention, the plastic material melt is injected into a completely closed die mould (back-injection), and, for this reason, the formation of dipping cants on the die may be dispensed with. Moreover, the cavity formed by the two die halves may assume any desired position in relation to the horizontal. As in FIG. 1b), here the die mould 2 is designed in such a way that it is possible, by means of the latter, to produce borders 4 which comprise a thinner rim 7 and both lower and upper fingers 9 which in each case are separated from one another by holding webs 23. Other flowable or pasty masses 5, if appropriate consisting of a plurality of components, may likewise be injected and consolidated at least partially or solidified partially.

Figure 2:
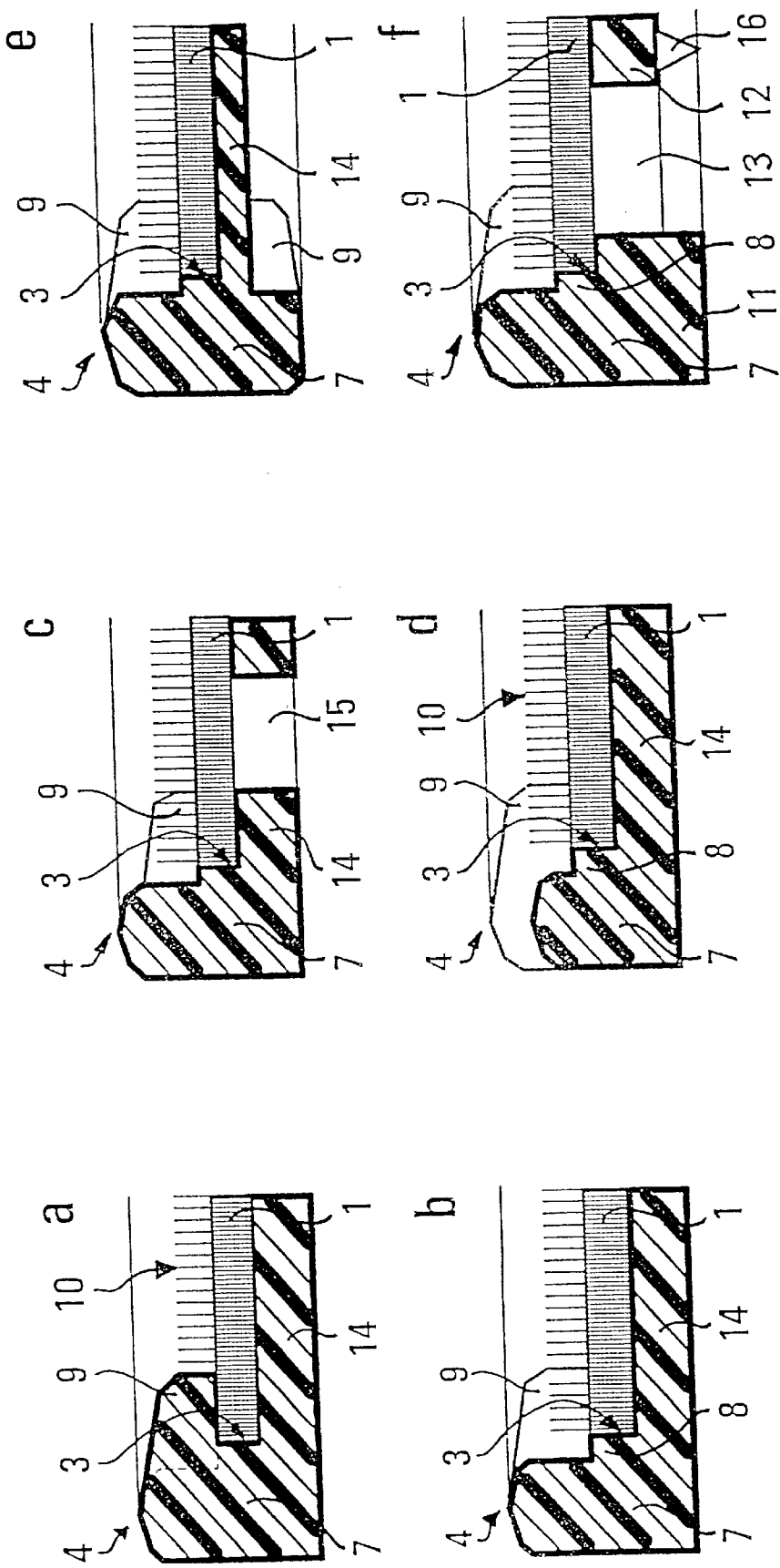
FIG. 2 shows sectional illustrations of borders of the edge of a decorative material.

FIG. 2 illustrates preferred embodiments of borders of decorative material. FIG. 2a) shows a section, perpendicular to the main direction of extent of the decorative material, through the bordered edge 3 of the latter. In this case, the section runs through a finger 9 which engages over the decorative material 1. This finger is integrally formed on a rim 7 which is essentially perpendicular to the main direction of extent of the decorative material 1. The pile of the decorative material 1 has straightened up again after removal from the mould, but the finger 9 nevertheless projects above the level 10 of the decorative material here. Simultaneously with the formation of the rim 7 and of the fingers 9, a supporting plate 14 has been integrally formed, and connected to the decorative material 1, below the latter. In FIG. 2b), the section runs parallel to that in FIG. 2a) the difference being that the said section is drawn only through the rim 7 of the same embodiment of a border 4, not through a finger 9. A finger 9 is illustrated in the view. Between the rim 7 and the decorative material 1, on which the rim 7 is integrally formed, a compensating zone 8 filled with plastic material can be seen. Tolerances of the decorative material in the region where the fingers 9 engage over it are absorbed by this compensating zone. Between the many fingers occur niches which cover this compensating zone in the same way as blind joints, but running essentially at right angles to the edge of decorative material.

The variants, illustrated in FIGS. 2c) to 2f), of the border 4 according to the invention for a decorative material 1 differ from those discussed hitherto in the design or recessing of orifices 15 in the supporting plate 14 and in the design of a rim 7 which projects above the fingers 9 (FIG. 2c); in a rim 7, over which the fingers 9 engage and which, for example, only just reaches the level 10 of the decorative material 1 (FIG. 2d); in the additional formation of fingers 9 which engage under a thinner supporting plate 14 (FIG. 2e) and in a web 11 which is integrally formed on the rim 7 and which is connected by means of bars 12 forming a supporting lattice 13 for the decorative material 1 (FIG. 2f) and engages under this decorative material. In addition, bosses 16 may be integrally formed on the web 11, the supporting lattice 13 or the supporting plate 14, preferably on their underside, the said bosses preventing a bordered decorative material used as an overlay carpet or footmat from slipping out of place.

Figure 3:
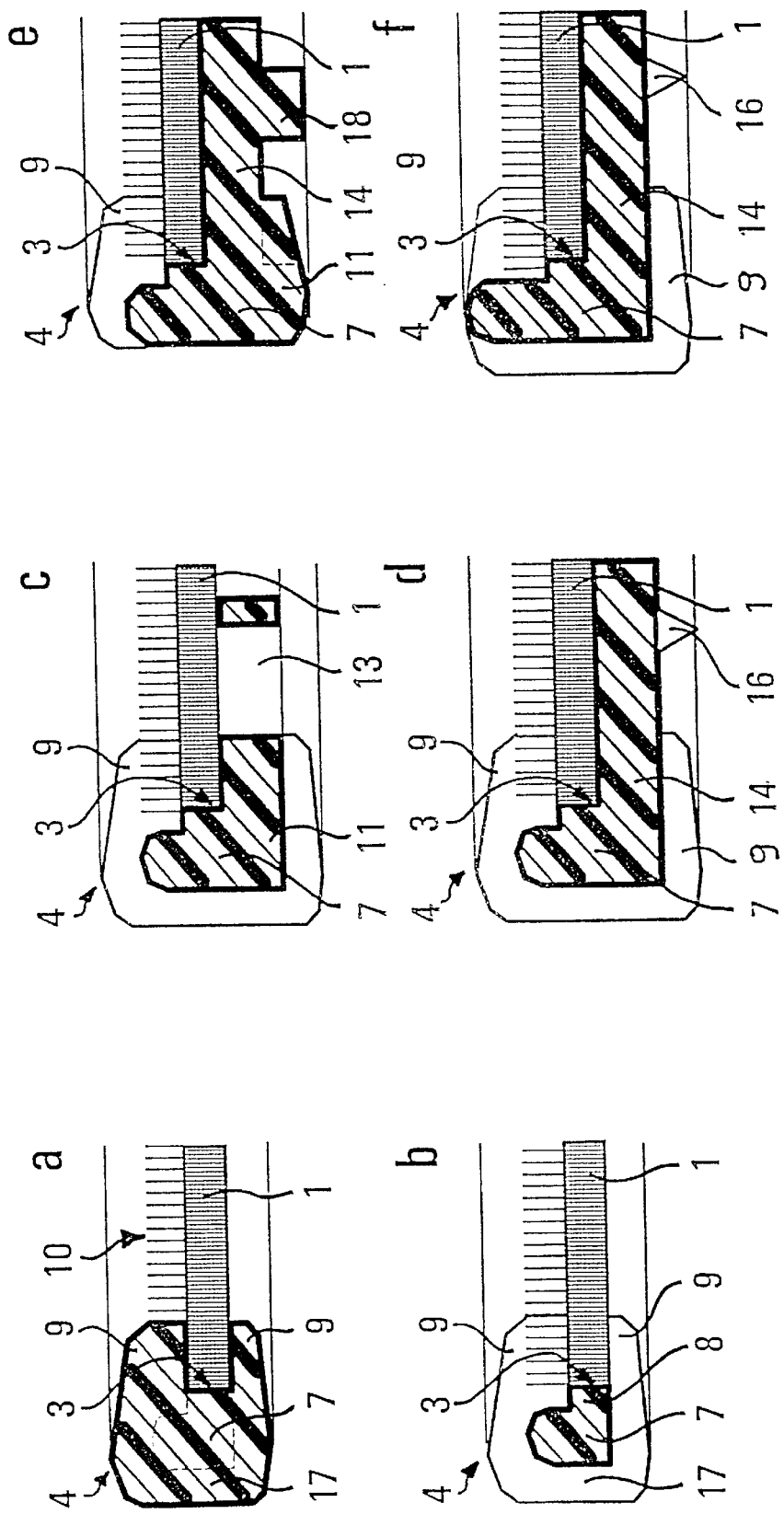
FIG. 3 shows sectional illustrations of borders of the edge of a decorative material which have a rim of reduced thickness.
Figure 4A:
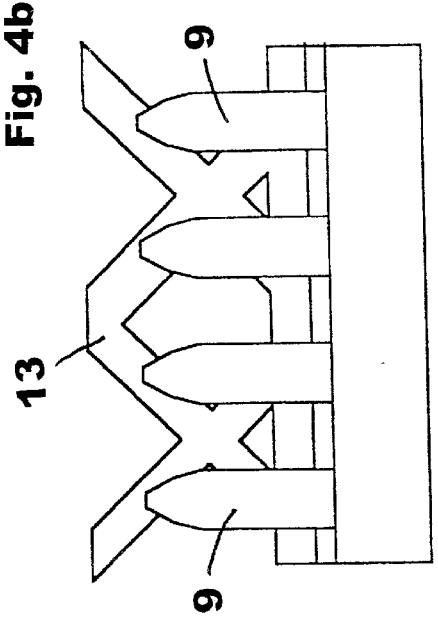
FIGS. 4a–d show selected top views of borders of the edge of a decorative material according to FIGS. 2(a, f) and 3(d, f), respectively.
Figure 4B:
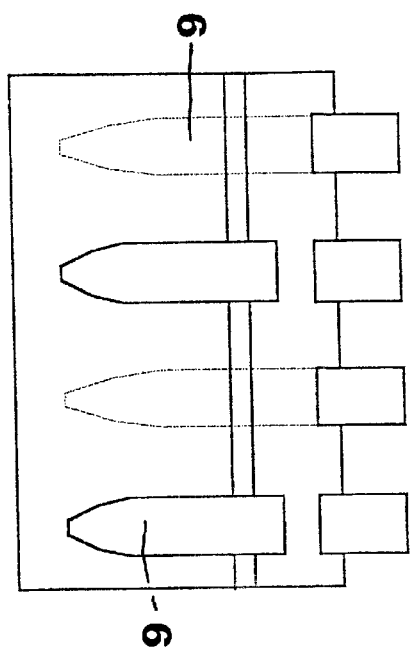
Figure 4C:
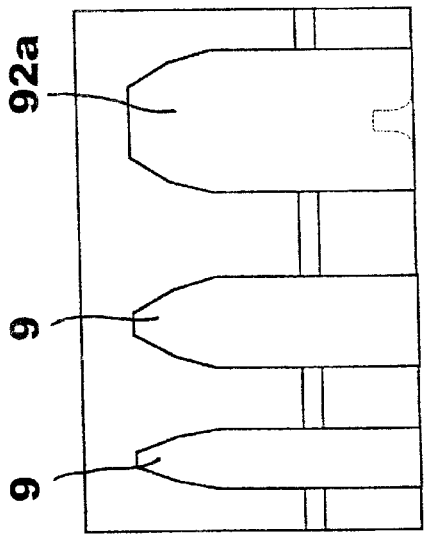
Figure 4D:
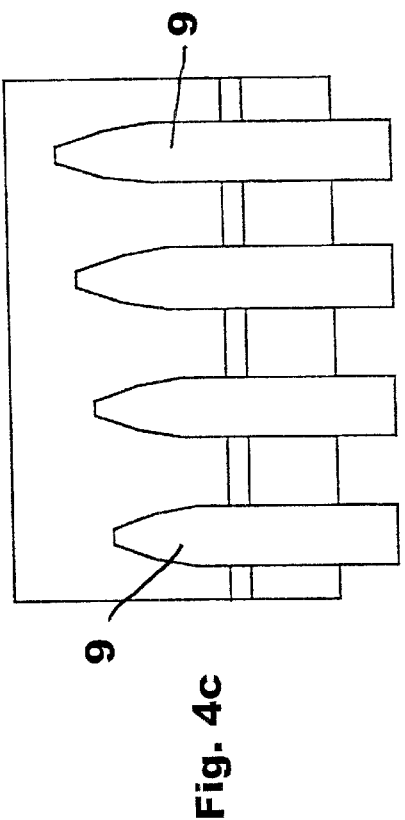

FIG. 3 illustrates likewise preferred embodiments of borders of decorative material. FIG. 3a) shows a section, perpendicular to the main direction of extent of the decorative material 1, through the bordered edge 3 of the latter. The section runs, in this case, through two fingers 9 which engage over and under the decorative material 1 respectively. These fingers are integrally formed on a rim 7 (represented by broken lines) which is essentially perpendicular to the main direction of extent of the decorative material 1 and has exactly the same height as the decorative material. The pile of the decorative material has straightened up again after removal from the mould, but the finger 9 nevertheless projects above the level 10 of the decorative material. Simultaneously with the formation of the rim 7 and of the fingers 9, ribs 17 have been integrally formed on the outside of the said rim and been connected to the fingers 9. By these ribs being integrally formed, the cross section of the rim 7 can be reduced, thus contributing to increased flexibility of the border 4, without the protective effect for the edge 3 of the decorative material 1 being impaired. In FIG. 3b), the section runs parallel to that in FIG. 3a), the difference being that the said section is drawn only through the rim 7 of the same embodiment of a border 4, not through the fingers 9. Two fingers 9 and one rib 17 are illustrated in the view. Between the rim 7 and the decorative material 1, on which the rim 7 is integrally formed, can be seen a compensating zone 8 filled with plastic material. Tolerances of the decorative material in the region where the fingers 9 engage over it are absorbed by this compensating zone. Between the many fingers occur niches which cover this compensating zone in the same way as blind joints. The embodiment illustrated in FIGS. 3a) and 3b) comprises an extremely flexible border 4 of the edge 3 of the decorative material 1. Decorative materials bordered in this way are particularly suitable for the lining or covering of surfaces which have many unevennesses. On the other hand, a more rigid, harder-wearing decorative material, such as a carpet, can be bordered reliably, and yet in a space-saving way, without a supporting lattice or a supporting plate having to be integrally formed.

The variants, illustrated in FIGS. 3c) to 3f), of the border 4 according to the invention for a decorative material 1 differ from those discussed hitherto in the design of a web 11 and of a supporting lattice 13 which connects to one another at least regions of this web engaging round the decorative material and which is integrally formed on the decorative material 1 or the rim 7 (FIG. 3c); in the design of a supporting plate 14, likewise integrally formed on the rim 7, with or without orifices 15 (FIG. 3d), which supporting plate can connect at least regions of the web 11 to one another; in the additional design of strips 18 which additionally stabilize the supporting plate 14 (FIG. 3e), and in a rim 7 which reaches the same height as the fingers 9 (FIG. 3f) or even projects above these. The fingers 9 may also be integrally formed in an alternating sequence on the top side and underside of the rim, so that they engage alternately under and over the decorative material 1 (FIGS. 3e, f). Fingers 9 may be arranged on the underside of the rim 7, of the web 11 or of the supporting plate 14, in such a way that they engage under the decorative material 1 or the supporting plate 14. In addition, bosses 16 may be integrally formed on the supporting lattice 13 or the supporting plate 14, preferably on their underside, the said bosses preventing a bordered decorative material used as an overlay carpet or footmat from slipping out of place.

FIGS. 4a–d illustrate various embodiments of the border 4 according to the invention for decorative material 1, as described above. The individual top views of FIGS. 2(a, f) and 3(d, f) show details of a straight border of the corresponding figure. The invention also, of course, embraces borders which are produced so as to be curved or angled.

Like the rim 7 and the fingers 9, the further elements of the border 4, for example the web 11, the bars of the supporting lattice 13 or the supporting plate 14, may also be produced in one piece, and connected to the decorative material, in one operation. Any desired combinations of the features illustrated in the figures and described are likewise included in the scope of the present invention. As illustrated by way of example in FIGS. 4a and c, the width or length of the fingers may vary both in terms of different borders and within the same border. A stepped or continuous reduction or increase in the finger width or finger length may be provided in such cases. If wider fingers are designed (cf. FIG. 4a: 92a), incisions may be provided. These run preferably perpendicularly to the main direction of extent of the decorative material and increase the flexibility of the rim 7 or of the border. The fingers 9 may also be designed to be rounded, at least on parts, for example at their ends or transitions to the rim.

Figure 5:
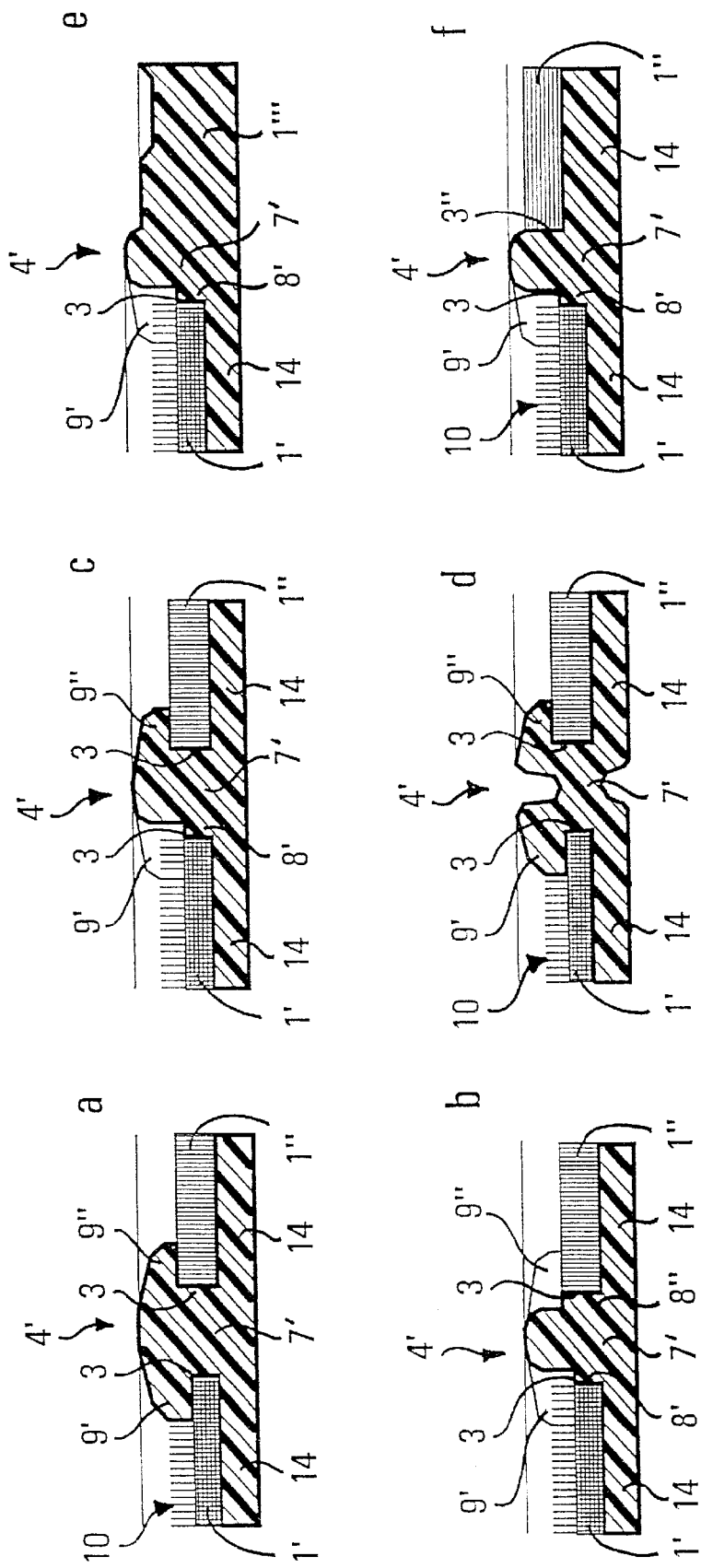
FIG. 5 shows sectional illustrations of borders of the edge of a decorative material, as a connection to a further decorative material or an insert.

FIG. 5 illustrates further preferred embodiments of borders of decorative material. FIG. 5a) shows a double border 4' of two decorative materials 1' and 1" which do not butt together completely, because they are separated by a rim 7' running perpendicularly to the main direction of extent of the two decorative materials. Identical or else different decorative materials may be arranged on both sides of the rim 7'. The section, here, runs through a double finger 9' which engages over the decorative material 1' and the decorative material 1". This double finger is integrally formed on the rim 7'. The pile of the decorative material 1' has straightened up again after removal from the mould, but the finger 9' nevertheless projects above the level 10 of the decorative material here. As illustrated, the decorative material 1" may also be designed without any pile and have the finger 9" engaging over it. Simultaneously with the formation of the rim 7' and of the fingers 9', 9", a supporting plate 14 has been integrally formed under the decorative materials and been connected to these.

In FIG. 5b), the section runs parallel to that in FIG. 5a), the difference being that the said section is drawn only through the rim 7' of the same embodiment of a border 4', not through a finger 9', 9". A finger 9', 9" is illustrated in the view. Between the rim 7' and each of the decorative materials 1' and 1", on which the rim 7' is integrally formed, can be seen a compensating zone 8', 8" filled with plastic material. Tolerances of the decorative material in the region where the fingers 9', 9" engage over it are absorbed by these compensating zones. Between the many fingers occur niches which cover this compensating zone in the same way as blind joints, but running essentially at right angles to the edge of the decorative material.

The variants, illustrated in FIGS. 5c) to 5f), of the border 4' according to the invention for decorative materials 1', 1" differ from those discussed hitherto in the design of fingers 9', 9" integrally formed alternately on the rim 7', (FIG. 5c); in narrowings either on one side or on two sides in the rim 7', with the result that a flexible connection is made between the decorative materials 1' and 1" and the insert 1''' (FIG. 5d); in an insert 1''' being integrally formed on one side onto the rim 7', this insert comprising the same material as the rim 7' and its surface being capable of being structured in the manner of a relief, for example in the form of an identification mark or logo (FIG. 5e); and in the choice of an extremely stable decorative material 1", the edge 3" of which can butt flush onto the rim 7', without fingers being formed (FIG. 5f). Inserts 1''' may be located at the edge in the main direction of extent of a decorative material or inside the latter, so that the insert is surrounded completely or partially by decorative material.

Figure 6:
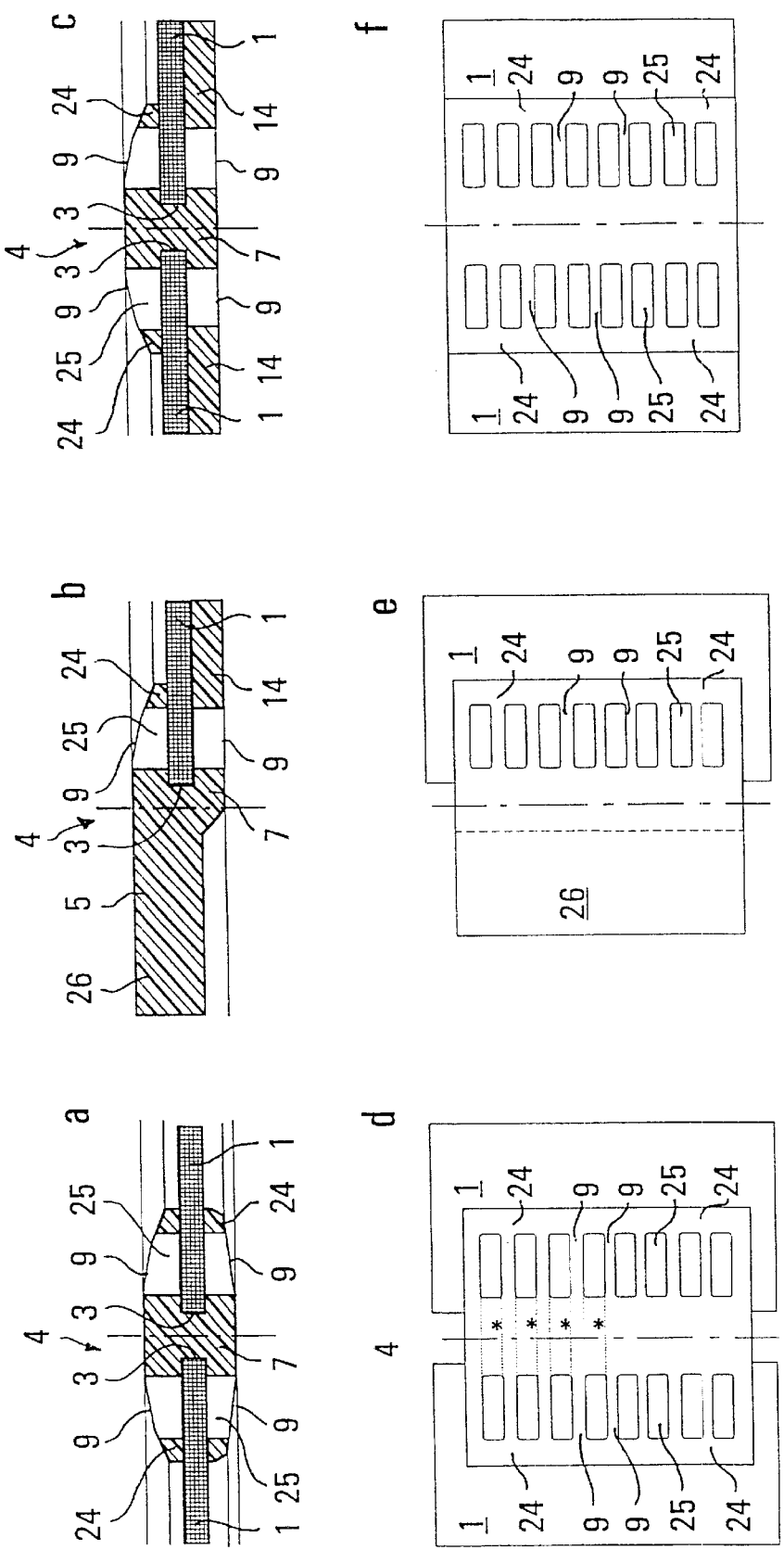
FIG. 6 shows sectional illustrations and top views of borders of the edge of a decorative material, according to a further embodiment.

FIG. 6 illustrates further embodiments of the border 4 according to the invention for decorative material. A characteristic of this embodiment is the design of very thin fingers 9 which engage under and over the decorative material on one side or on both sides and at least some of which are connected, preferably in the region of their tips, to the tips of the adjacent fingers 9 via a transverse web 24.

Thus, FIG. 6a shows a cross section through and FIG. 6d a top view of a connection of two sheet-like decorative materials 1, such as leather, cloth and the like, which are of approximately the same thickness. The edges 3 of the decorative materials 1 are separated from one another by a rim 7 and are surrounded completely. The rim 7 may in each case be lower between the fingers 9 (shown only partially, see the regions designated by an asterisk between the dotted lines in FIG. 6d), thus bringing about an additional improvement in the flexibility of the border 4 of the decorative materials 1. The integrally formed recesses 25 between the rim 7, the fingers 9 and the transverse web 24 may be open to the surface of the decorative material 1 (as shown) or be partially filled in such a way that they do not reach completely down to or up to the decorative material 1.

FIG. 6b shows a cross section and FIG. 6e a top view of an insert 26 which consists of plastic mass 5 and which directly adjoins a rim 7. The rim 7 is connected to the decorative material 1 via fingers 9. The decorative material, which may, for example be a carpet, a textile cloth, leather or a sheet, is underlaid with a supporting plate 14. Whilst the supporting plate 14 connects the fingers 9 on the underside, the individual fingers are connected on the top side by means of a transverse web 24. The insert 26 may, as shown, be somewhat offset on its underside or else be provided at the same level as the supporting plate 14. The edge 3 of the decorative material butts onto the rim 7 and is bordered completely by the latter. The integrally formed recesses 25 between the rim 7, the fingers 9 and the transverse web 24 may be open to the surface of the decorative material 1 (as shown) or be partially filled in such a way that they do not reach completely down to or up to the decorative material 1.

FIG. 6c shows a cross section and FIG. 6f a top view of a connection of two identical or different decorative materials 1 consisting, for example, of carpet, cloth, leather or sheeting. The connection consists of a rim 7 which surrounds the edges 3 of the decorative materials 1 and which is connected to the decorative material via fingers 9. The decorative material is underlaid with a plastic supporting plate 14. Whilst the supporting plate 14 connects the fingers 9 on the underside, the individual fingers 9 are connected on the top side by means of a transverse web 24. The integrally formed recesses 25 between the rim 7, the fingers 9 and the transverse web 24 may be open to the surface of the decorative material 1 (as shown) or be partially filled in such a way that they do not reach completely down to or up to the decorative material 1.

Further embodiments according to the invention comprise all the features described or illustrated in the figures and all further possible combinations of these.

In order to produce a border 4, 4' of a decorative material 1, according to a first embodiment, first a decorative material 1, already preformed according to the desired contour, is introduced into the cavity 6. In this case, for example, vacuum nozzles can hold the decorative material 1 on the die upper part 2'. The decorative layer 2 is dimensioned in such a way that it already has the desired size. The die upper part 2' is subsequently moved towards the die lower part 2" by means of a vertical movement, until the two die halves are positioned relatively near to one another, as illustrated in FIG. 1a. The needle-closure nozzles 19 of the back-pressing die of the die mould 2 are thereafter opened until a predetermined quantity of plasticized plastic material melt 5 has flowed into the cavity 6. The further needle-closure nozzles (not illustrated), likewise opening into the cavity 6, are subsequently opened in succession. In the illustration of FIG. 1, these method steps have already been carried out. The plastic mass 5 is introduced at a relatively low pressure, so that it remains lying on the die lower part 2" in the region of the needle-closure nozzles, without already coming into contact with the decorative material 1. The die mould 2 is thereafter closed completely by means of a further vertical movement of the die upper part 2'. The die upper part 2' thereby presses, via the decorative material 1, onto the plastic mass 5, with the result that the latter is positively displaced and is distributed uniformly in the cavity 6. As early as during this positive-displacing movement, the dipping cant 21 of the die upper part 2', together with the opposite cant 22 of the tool lower part 2", closes the die mould 2. The dimensions of the dipping cant 21 are coordinated with those of the cant 22 in such a way that the die mould 2 remains open, for venting, until, as a result of the positive-displacement pressing, the plastic mass 5 is located in the region of the dipping cant 21, but has not yet emerged.

After a standing or cooling time has elapsed in order to achieve an at least partial crystallization or solidification action, the die halves are moved apart, the die 2 is thereby opened again and the finished bordered decorative material 1 is ejected by ejectors, not illustrated, which are arranged on the die lower part 2". In order to prevent subsequent undesirable shrinkage, relative to the decorative material, of the plastic material connected to the latter by back-pressing and/or back-injection, the die mould 2 and the inserted decorative material 1 may be previously preheated by heating means, not illustrated, and consequently pre-expanded correspondingly.

In this description of an example of the production of a one-piece border 4, 4' of a decorative material 1 in the die 2, the die parts designated as the die upper part 2' and die lower part 2" may be interchanged, so that the die lower part 2" receives the decorative material before the back-pressing or back-injection operation and, for example, the ejectors are arranged in the die upper part 2'.

According to a second preferred embodiment of the invention (see FIG. 1b), the die mould 2 is designed without needle-closure nozzles 19. The plastic mass or the plastic material melt 5 can then be introduced into the cavity 6 between the die parts 2' and 2", for example by means of a movable wide-slit nozzle, according to the extrusion-laying method. The die mould 2 is thereafter closed completely by means of a further vertical movement of the die upper part 2'. The die upper part 2' thereby presses, via the decorative material 1, onto the plastic mass 5, with the result that the latter is positively displaced and is distributed uniformly in the cavity 6. As early as during this positive-displacement pressing movement, the dipping cant 21 of the die upper part 2', together with the opposite cant 22 of the die lower part 2", closes the die mould 2. The dimensions of the dipping cant 21 are coordinated with those of the cant 22 in such a way that the die mould 2 remains open, for venting, until, as a result of the positive-displacement pressing, the plastic mass 5 is located in the region of the dipping cant 21, but has not yet emerged.

In a third preferred embodiment (see FIG. 1c) of the method according to the invention, the die mould 2 is closed completely, before the plastic material melt 5 is injected into the cavity 6. For this reason, the formation of a dipping cant 21 and of the cant 22 located opposite the latter may be dispensed with in the die mould.

Back-injection or back-pressing according to the source-flow or extrusion-laying methods or any combinations of these processes preferably come into consideration as processes which can be employed for the one-piece production of the borders 4, 4' according to the invention for decorative material 1. The borders illustrated are, of course, merely examples and may be varied, as desired, within the scope of the invention and assigned in each case to the other production methods.

Materials coming into consideration are all the plastics suitable for a combined back-pressing/back-injection method, that is to say thermoplastics or permanently elastic polymers, such as, for example, polypropylene, ABS copolymers (acrylonitrile/butadiene/styrene copolymers) or thermoplastic rubbers, etc. These plastics may also be reinforced, for example, with fibres or mats. At the same time, differently coloured decorative materials and/or plastics of varying texture are also often used. In contrast to the methods and materials described, other flowable or pasty masses 5 may also be used for producing the borders according to the invention.

The following practical examples will be mentioned as an in no way conclusive illustration:

Fitting or trimming elements in means of transport (for example, in cars, buses, trams, trains, ships or aircraft): in this case, the borders 4 according to the invention for decorative material may be provided as overlay carpets or trim parts in transport vehicles or as movable foldable covers of a boot or as just such a boot floor lining.

Structural parts for cladding or fitting-out houses (for example, in bathrooms, furniture or seating furniture, shops, exhibition equipment): in this case, the decorative material bordered according to the invention may cover service orifices in bathtub skirts or shower cubicles, as well as safety or distributor boxes of electrical systems in residences or exhibition apparatus. Use as bathroom carpets or footmats may also be envisaged.

Fitting or cladding elements in portable equipment (for example, in suitcases for travel luggage, files or instruments): in this case, the decorative materials bordered according to the invention may cover both containers in the suitcase shell or in partitions such as address or other such compartments.

What is claimed is:

1. A method for the bordering of decorative material in which a border is formed in a die mould for one of back-pressing and back-injection at least on parts of an edge of the decorative material, the method comprising the steps of:

inserting the decorative material into a cavity of the die mould, said cavity being formed by die halves;

introducing flowable mass into the cavity;

closing the die mould;

distributing the flowable mass in the cavity; and ejecting the bordered decorative material after at least partial solidification of the flowable mass, wherein a one-piece formation of a rim and a multiplicity of fingers spaced apart from one another and extending from the rim is formed by the above steps, said rim extending essentially at right angles to the main orientation of the decorative material and extending along an edge of the decorative material, said multiplicity of fingers extending over or under and engaging the decorative material, and wherein said rim and multiplicity of fingers are connected to said decorative material.

2. The method according to claim 1, wherein the decorative material is one of carpet, fabric and sheet material.

3. The method according to claim 1, wherein the decorative material is of a height and the rim is formed so that it projects above the height of the decorative material.

4. The method according to claim 1, wherein at the same time the rim and multiplicity of fingers are formed, a web is formed integral with the rim and multiplicity of fingers, said web engaging an underside of the decorative material.

5. The method according to claim 4, wherein webs are connected, at least in regions, to bars forming a lattice for supporting the decorative material.

6. The method according to claim 4, wherein webs are connected, at least in regions, to a supporting plate for the decorative material.

7. The method according to claim 5, wherein bosses are integrally formed on the underside of the supporting lattice.

8. The method according to claim 6, wherein bosses are integrally formed on the underside of the supporting plate.

9. The method according to claim 6, wherein orifices are formed recessed in the supporting plate.

10. The method according to claim 6, wherein the multiplicity of fingers engage under one of the decorative material and the supporting plate and are integrally formed on one of the underside of the rim, the web and the supporting plate.

11. The method according to claim 1, wherein ribs, which are continuations of the multiplicity of fingers, are integrally formed on the outside of the rim.

12. The method according to claim 1, wherein the multiplicity of fingers are integrally formed in an alternating sequence on a top side of the rim extending over the decorative material and an underside of the rim extending under the decorative material.

* * * * *